United States Patent [19]

Roedel

[11] 4,160,858

[45] Jul. 10, 1979

[54] SOLVENTLESS SILICONE RESINS

[75] Inventor: George F. Roedel, Schenectady, N.Y.

[73] Assignee: General Electric Company, Waterford, N.Y.

[21] Appl. No.: 873,802

[22] Filed: Jan. 31, 1978

[51] Int. Cl.$^2$ .............................................. C08F 11/04
[52] U.S. Cl. ....................................... 528/14; 528/15; 528/19; 528/17; 528/18
[58] Field of Search ..................................... 528/14, 15

[56] References Cited

U.S. PATENT DOCUMENTS

| | | | |
|---|---|---|---|
| 2,521,672 | 9/1950 | Berhenke | 528/14 X |
| 2,718,512 | 9/1955 | Warrick | 528/14 X |
| 3,098,833 | 7/1963 | Solomon | 528/14 X |
| 3,428,706 | 2/1969 | Jasinski et al. | 528/14 X |
| 3,642,693 | 2/1972 | Jasinski | 528/14 |
| 3,668,180 | 6/1972 | Brennan et al. | 528/14 |
| 3,719,634 | 3/1973 | Clark et al. | 528/14 X |
| 3,847,848 | 11/1974 | Beers | 528/14 X |

*Primary Examiner*—Paul F. Shaver
*Attorney, Agent, or Firm*—John L. Young; E. Philip Koltos; Philip L. Schlamp

[57] ABSTRACT

There is provided by the present invention a process for producing a solventless silicone resin having a viscosity at 100% varying from 200 to 5,000 centipoise at 25° C., comprising adding a mixture of water and alcohol to the desired organochlorosilanes taking the silicone alkoxylate and washing it repeatedly with alcohol until the acid content is at least below 1000 parts per million, adding an alkali metal hydroxide to reduce the acidity of the silicone alkoxylate such that it does not exceed 100 parts per million, and then adding sufficient water such that the amount of water that is added is between 0.2 to 0.8 moles of water per mole of hydrocarbonoxy radicals in such silicone hydrolyxate. The excess alcohol and water is stripped off to give the solventless silicone resin of the instant invention having an organo to Si ratio varying from 1.1 to 1.9, having a silanol content varying from 1 to 4% by weight and a hydrocarbonoxy content that varies from 7 to 14% by weight.

A less preferred solventless system can be obtained by simply mixing in an organic solvent, a high alkoxy containing silicone resin produced by traditional procedures, and a high silanol silicone resin also produced by traditional procedure and stripping off the solvent.

15 Claims, No Drawings

SOLVENTLESS SILICONE RESINS

BACKGROUND OF THE INVENTION

The present invention relates to a process for producing a solventless silicone resin and more particularly the present invention relates to a solventless silicone resin and a process for producing a solventless silicone resin where such silicone resin has a viscosity varying anywhere from 200 to 5,000 centipoise at 25° C.

Silicone resins are well known in the art. Such silicone resins usually comprise a resin compound of trifunctional siloxy units and difunctional siloxy units with a silanol content varying anywhere from 0.1 to 8% and optionally an alkoxy content varying anywhere from 0 to 4% by weight. Such silicone resins composed of trifunctional siloxy units and difunctional siloxy units are the most prevalent type of silicone resins for forming varnishes and silicone based paints, as well as for forming molding and encapsulating silicone compositions. It should be noted that such silicone resins are desired in the above applications since it has been found that products produced from silicones and silicone resins usually have better high temperature stability and weatherability properties as compared to traditional organic compositions.

There is also present in silicone chemistry, silicone resins composed of monofunctional siloxy units and tetrafunctional siloxy units with optionally difunctional siloxy units. However, such resins have been found to be more useful in the production of surfactants and silicone adhesives rather than in the fabrication of coatings. Accordingly, a highly successful silicone coating usually comprises one having trifunctional siloxy units and difunctional siloxy units since the combination of such units in a silicone resin give the resin, when it cures, the appropriate hardness while at the same time giving it some flexibility such that it can in some cases withstand extreme temperature cycling which is not possible with organic resins and compositions. An example of a suitable silicone resin to be found in the prior art is, for instance, that disclosed in the patent of Roedel, U.S. Pat. No. 3,846,358, whose disclosure is hereby incorporated by reference. This reference provides the production of a silicone resin without the use of a water immiscible organic solvent, but by the use of an aliphatic alcohol.

Simply the Roedel process comprises taking a mixture of alcohol and water in the appropriate amounts, adding it to the organochlorosilanes, and producing the appropriate alkoxylated siloxane. The alkoxylate is then washed with an aliphatic alcohol such that the acidity of the silicone alkoxylate is in the area of 1000 parts per million of acid or below. Then there is added an alkali metal hydroxide to the silicone hydrolyzate to further reduce the acidity to the desired level.

Finally, there is added to the silicone alkoxylate additional water and an aliphatic alcohol as a solubilizing agent to hydrolyze most of the alkoxy groups in the silicone alkoxylate to form the desired silicone resin therefrom. The alcohol is then stripped from the silicone resin to leave behind a solid mass or the resin may be cut in organic solvent for use in various products and compositions such as varnishes, silicone paints, molding compositions and also as a silicone resin encapsulant. However, while such silicone resins have many advantages they have one well-known disadvantage, they cannot be utilized as solventless resins in liquid form. Accordingly, in most cases, to utilize such silicone resins, it is necessary to utilize an organic solvent to dissolve the silicone resin so that it is present in anywhere from 5% to 90% silicone solids in solution so that it can be utilized and incorporated in various compositions.

It should be noted with respect to the Roedel process, in Column 6 beginning with line 42, Roedel points out that there is sufficient water added to his silicone resin such that most of the alkoxy and halogen groups are removed from his final silicone resin product. In addition, Roedel points out specifically in Column 7, line 32, that his silicone resin has an alkoxy content that varies from 0.2 to 4.0% by weight. Further, it should be noted that in Example 1, the silicone resin product that was obtained by the procedure of Roedel was a hard brittle solid. Accordingly, this disadvantage of the silicone resin of Roedel, that is in order for it to be a liquid at room temperature, it has to be dissolved in an organic solvent and is a disadvantage that has gained more prominence recently.

Accordingly, organic solvents while suitable for dissolving the silicone resin and preparing an appropriate solution have the disadvantage that they have to be disposed of or evaporated after the silicone resin has been incorporated into a composition. Accordingly, because of restrictions in many geographical areas much care and thought has to be allotted to the proper handling and disposal of such solvents after they have been utilized in the particular process.

Accordingly, the use of organic solvents results in unnecessary expense in whatever process they are utilized in, both in their initial cost and in their final disposal.

It should be noted that while the Roedel patent involved a process which did away with the use of hydrocarbon solvents in the actual process of producing the silicone resin, nevertheless, because of the form that the final product is produced a hydrocarbon solvent is needed for the final silicone resin product to be utilized properly.

Accordingly, for the above reasons, it was highly desirable to develop a solventless silicone resin system, that is, where the final silicone resin product would be a liquid of desirable low viscosity at room temperature, such that a solvent is not needed.

Solventless silicone resin system is, for instance, to be found in the patent of Mink, U.S. Pat. No. 3,948,848, which has recently issued. Such solventless silicone resins as disclosed in this patent comprise a two-component silicone resin system in which one-component comprises a vinyl-containing copolymer composed of trifunctional siloxy units and difunctional siloxy units, and the second component comprises a copolymer containing hydrosiloxy units in which the units themselves are selected from trifunctional siloxy units and difunctional siloxy units. In such compositions in either one or the other of the two components there is present a platinum catalyst. If it is desired to cure the composition of this patent the two compositions are mixed together and cured in the presence of a platinum catalyst to form a silicone encapsulating composition. It is also disclosed that such a composition can be utilized as a one-component system by the use of inhibitors. It is also disclosed that other less expensive catalysts may be used in such compositions by the patentee but nevertheless, it has been found by experience and as the patent states that platinum is the most preferred catalyst for such curing reactions.

While such composition has been found to be an appropriate encapsulating composition, it has several disadvantages. The most pronounced disadvantage is that it is quite expensive because of the use of two components and also the platinum catalyst. Further, such two component systems are difficult to work with by inexperienced applicators. Another disadvantage of such a composition as that disclosed in the foregoing Mink patent is that the cured composition does not have desirable thermal stability at temperatures above 250° C. for extended periods of time. The reason for this is that the ethylene chain that is formed by the hydrogen atom adding on to the vinyl group in the curing of the silicone resin results in an ethylene bond which is not that stable at temperatures exceeding above 250° C. Accordingly, both in terms of expense and in terms of properties, the above Mink composition while having many advantages has those disadvantages which detract from its utility.

Another development in the solventless systems is that to be found in Magne, U.S. Pat. No. 3,978,025. The Magne process has two disadvantages while it does produce a suitable solventless silicone resin system. In the Magne process, while the chlorosilanes are hydrolyzed in an alcohol-water mixture, nevertheless, in order to maintain a homogeneous medium Magne teaches the use of an organic solvent. Accordingly, his process has the disadvantage of the handling and disposal of such organic solvents.

Another disadvantage in Magne's process is that he discloses in Column 3 the use of a large excess of water in his final hydrolysis step.

Accordingly, it was highly desirable to develop a solventless silicone resin and a process for developing a solventless silicone resin having the appropriate low viscosities at room temperature, that is, a viscosity in the neighborhood of 200 to 5,000 centipoise at 25° C., or preferably viscosities of 400 to 2,000 centipoise at 25° C., which do not utilize a hydrocarbon solvent in the process for their production, and which are inexpensive to produce and use. Accordingly, it is one object of the present invention to provide for an improved process for producing solventless silicone resins without using hydrocarbon solvents.

It is an additional object of the present invention to provide for an improved solventless silicone resin system which is inexpensive and simple to produce.

It is an additional object of the present invention to provide for a solventless silicone resin system which has a viscosity varying anywhere from 200 to 5,000 centipoise at 25° C.

It is still an additional object of the present invention to provide for a solventless silicone resin having a viscosity that does not exceed 5,000 centipoise at 25° C. that is composed of trifunctional siloxy units and difunctional siloxy units having a silanol content that varies from 1 to 4% and having a methoxy content that varies from 7 to 14% by weight.

It is yet an additional object of the present invention to provide for a process for producing a solventless silicone resin system which is eminently suitable for the production of silicone paints and silicone varnishes. These and other objects of the present invention are accomplished by means of the disclosure set forth hereinbelow.

SUMMARY OF THE INVENTION

In accordance with the above objects, there is provided by the present invention a process for producing a solventless silicone resin having a viscosity at 100% solids varying from 200 to 5,000 centipoise at 25° C., comprising (a) adding to organochlorosilanes of the formula, $$R_a SiCl_{4-a}$$

where R is selected from the class consisting of alkyl radicals, cycloalkyl radicals, alkenyl radicals, aryl radicals and fluoroalkyl radicals, all having up to 8 carbon atoms, and mixtures thereof where a is 1 or 2, from 0.05 to 0.2 part of water, and from 0.1 to 1 part of an aliphatic alcohol of up to 3 carbon atoms, per part of organochlorosilanes to form a silicone alkoxylate; (b) refluxing the alkoxylate; (c) inserting additional amounts of said aliphatic alcohol to said alkoxylate and removing said alcohol until the acid content of said alkoxylate is below 1000 parts per million; (d) adding an alkali metal hydroxide to the said alkoxylate until its acid content does not exceed 100 parts per million; (e) adding water to said alkoxylate such that the amount of water that is added is from 0.2 to 0.8 moles of water per mole of hydrocarbonoxy radicals in said alkoxylate; and (f) heating said alkoxylate so as to complete the hydrolysis reaction with the additional water to obtain the desired resin product. In step (b) HCl is removed by distillation and the reaction driven toward completion. In any case, some distillation by heat of the excess acid is desirable since that will remove a large amount of the acid from the silicone alkoxylate without requiring repeated washing with the aliphatic alcohol.

To remove the small amounts of acid, it is necessary after the refluxing to wash the silicone alkoxylate with quantities of an aliphatic alcohol and remove the alcohol phase by heating the silicone alkoxylate so as to strip off the alcohol and acid or by physical separation of the acid-alcohol phase. Such stripping procedures may be carried out any number of times until, preferably, the acid content is below 1000 parts per million. Finally, it is desirable to reduce the acid content to 100 parts per million or below and more preferably to 50 parts per million or below by adding an alkali metal hydroxide such as, potassium hydroxide, to the silicone alkoxylate to effect such acid reduction. The reason the alkali metal hydroxide is not used initially in the reduction of acidity is that large quantities of the alkali metal hydroxide would be utilized and the salts that would be formed as a result of such neutralization reactions have an undesirable effect on the electrical properties of the cured silicone resin. Accordingly, it is not desirable to add the alkali metal hydroxide to the silicone alkoxylate until most of the acid has been removed and then the alkali metal hydroxide is added to simplify the final acid reduction to the appropriate level.

In addition, it should be noted that it is desired to reduce the acidity of the silicone resin alkoxylate to the appropriate level as indicated above since if water is added in the final hydrolysis and there is a large amount of acid present then what results is that the silanol groups are condensed out to result in a high viscosity silicone resin and one that has too few silanol groups to effect proper cure of the silicone resin to form a hard coat or film in the final application of the resin.

Accordingly, after the acidity of the alkoxylate has been reduced then the appropriate amount of water is simply added to effect the final silicone resin product. Further, in the final addition of water, it is desirable that the water be added in increments so as to effect better reaction in the final hydrolysis reaction. It is also desirable that some alcohol optionally be used in the final hydrolysis of the silicone resin alkoxylate so that the silicone alkoxylate and water are solubilized, thus making it easier to react with the water.

Finally, it should be noted that the ratio of water to alkoxy groups, that is, the ratio of 0.2 to 0.8 moles of water per mole of alkoxy radicals in the silicone alkoxylate, that is, of the moles of water that is added to the final hydrolysis is critical. If too little water is added then sufficient silanol groups are not imparted to the silicone resin product and as a result the silicone resin product will not cure properly. If more than 0.8 moles of water, is added then too many of the hydrocarbonoxy radicals or alkoxy radicals will hydrolyze in the silicone alkoxylate resulting in the hydrolyzate cross-linking more than is desired and there results a silicone resin product of high viscosity.

Accordingly, it must be pointed out that the most critical aspect of the process of the instant invention is the concentration of moles of water that is utilized per mole of hydrocarbonoxy radicals in the silicone alkoxylate in the final hydrolysis reaction. Utilizing the above process there is obtained by the process of the present invention a silicone resin product having an organo to Si ratio that varies from 1.0 to 1.9:1, a silanol content that varies generally from 1 to 4% by weight and more preferably 1 to 3% by weight and a hydrocarbonoxy content that varies from 7 to 14% by weight and more preferably 7 to 12% by weight.

The solventless silicone resin may have at room temperature in the absence of a solvent, that is, at 100% solids, a viscosity that varies anywhere from generally 200 to 5,000 centipoise at 25° C., and more preferably a viscosity varying from 500 to 2,000 centipoise at 25° C. Such silicone resins may be cured with a metal salt of a carboxylic acid at a concentration of anywhere from 0.05 to 0.5% by weight of the metal by weight of the total silicone resin wherein the metal is selected from manganese to zinc in the Periodic Table with the exception that the metal salt of iron cannot be used at a concentration higher than 0.01% by weight of the metal and more preferably at a concentration no higher than 0.005% by weight of the total silicone resin solids and must be used in combination with one of the other metals. A more preferable curing system for such silicone resins is a combination of an amine functional silane and more specifically any of the amino propyl triethoxy silanes in combination with a metal salt of a carboxylic acid. There is utilized anywhere from 25 to 75% by weight of the metal salt of a carboxylic acid in combination with 25 to 75% by weight of the amine functional silane and where the total combination of catalysts varies from 0.5 to 4.0% by weight of the total silicone resin product.

The most preferred combination catalyst that can be utilized is a carboxylic acid salt of zinc in combination with gamma-aminopropyltriethoxysilane. Such a catalyst system is desired because it initiates cure of the silicone resin composition at temperatures of 150° C. while the other catalyst systems initiate cure at temperatures above 200° and more usually at 250° C.

The above process for the solventless silicone resin system is the most preferred in accordance with the instant invention. However, in the alternative there may be prepared another type of solventless silicone resin system in accordance with the disclosure of the instant case which is almost as desirable and has almost the same properties as the silicone resin produced by the process set forth herein above. Accordingly, in the alternative there may be produced a solventless silicone resin system having a viscosity at 100% solids varying from 200 to 5,000 centipoise at 25° C., comprising (a) from 35 to 65% by weight of a first silicone resin wherein said resin is composed of organo trifunctional siloxy units and diorgano difunctional siloxy units where the organo to Si ratio varies from 1.0 to 1.9:1; a hydrocarbonoxy content that varies from 10 to 25% by weight and a silanol content that is less than 1% by weight, and (b) from 35 to 65% by weight of a second silicone resin composed of monoorgano trifunctional siloxy units and diorgano difunctional siloxy units where the organo to Si ratio varies from 1.0 to 1.9:1, and has a hydrocarbonoxy content that varies from 0 to 4% by weight, and a silanol content that varies from 3 to 8% by weight, where the organo groups in said resins are selected from the class consisting of alkyl radicals, cycloalkyl radicals, alkenyl radicals, aryl radicals and fluoroalkyl radicals all having up to 8 carbon atoms and mixtures thereof.

The two silicone resins disclosed in the above solventless system are silicone resins produced by prior art methods. The two resins are simply dissolved in a hydrocarbon solvent, and the solvent is stripped off to yield the desired solventless silicone resin at 100% solids and having a viscosity within the range set forth hereinabove. Such solventless silicone resin systems can be utilized in the applications as stated previously without necessitating the use of organic solvents. However, in at least the case of the production of a silanol containing silicone resin of the prior art, such resin does involve the use of organic solvents in the process of producing it.

DESCRIPTION OF THE PREFERRED EMBODIMENT

The reactants for producing the silicone resins of the instant case comprise a mixture of organohalosilanes in which in most instances the halo is chlorine. For most practical purposes, the only type of halosilanes that are reacted to produce silicone resins are chlorosilanes where the chlorosilanes are composed of trifunctional chlorosilanes and difunctional chlorosilanes. Accordingly, the organochlorosilanes have the formula, $$R_a SiCl_{4-a}$$

where R is selected from the class consisting of monovalent hydrocarbon radicals and halogenated monovalent hydrocarbon radicals, and a is a whole number that is either 1 or 2, such that in the final silicone resin the R to Si ratio in the resin varies from 1.0 to 1.9:1. More preferably the R substituent groups in the formula of the chlorosilanes above is preferably selected from alkyl radicals such as, methyl, ethyl, propyl; cycloalkyl radicals such as, cyclohexyl, cycloheptyl, and etc.; alkenyl radicals such as vinyl, allyl; aryl radicals such as phenyl, methylphenyl, ethylphenyl; and fluoroalkyl radicals such as 3,3,3 trifluoropropyl. In the most preferred embodiment of the instant case, the R radical is selected from alkyl radicals, cycloalkyl radicals, alkenyl radicals, aryl radicals and fluoroalkyl radicals, all such radicals having up to 8 carbon atoms and mixtures of such radicals. Most preferably, the R radical is selected from methyl and phenyl and a is such that the proportionate amount of monoorgano trichlorosilane and diorganodichlorosilane will be sufficient such as to give the final silicone resin product the desired R to Si ratio that is desired for the particular resin. Such chlorosilanes are well known in the silicone art. Accordingly, to initiate the reaction, a mixture of alcohol and water are simply added to the foregoing chlorosilanes where the alcohol is an aliphatic alcohol of 1 to 3 carbon atoms. Most preferably the alcohol is methanol. Although aliphatic alcohols of above 3 carbon atoms may operate in some circumstances, nevertheless, the alkoxy groups that they form in the silicone resin product in the hydrolysis may not be desired in the silicone resins of the instant case since at high temperatures, that is, temperatures above 250° C., such higher alkoxy groups may be unstable. In addition, such higher aliphatic alcohols do not react as readily to produce the alkoxylated silicone resins of the instant case and do not hydrolyze off as readily.

Accordingly, the mixture of water and aliphatic alcohol is preferably added to a mixture of chlorosilanes such as, per part of organochlorosilanes there is utilized from 0.05 to 0.2 part of water and from 0.1 to 1 part of the aliphatic alcohol. Most preferably there is utilized from 0.05 to 0.5 parts of water and 0.1 to 0.4 parts of the aliphatic alcohol per part of organochlorosilane. Such amounts of alcohol and water are not necessarily critical. There must be sufficient water added such that the water will allow some of the chlorine groups in the silane to hydrolyze to be replaced by alkoxy groups from the alcohol and to allow some cross-linking of the chlorosilanes to form the silicone resin alkoxylate. It is important that too much water not be present in this initial hydrolysis reaction since if too much water is present then a small amount of alkoxy groups is formed and there will be formed silanol groups and siloxy cross-linking bridges between the silane monomer forming a high viscosity silicone resin.

Accordingly, most preferably there is utilized from 0.05 to 0.2 part of water per part of chlorosilanes such that the appropriate amount of alkoxy groups are formed in the silicone resin alkoxylate and such that the chlorosilanes are not overly hydrolyzed. In such a hydrolysis-alkoxylation procedure, it is desired to add the mixture of alcohol and water to the chlorosilane so as to maintain the temperature of reaction at room temperature or below. With such addition procedure at room temperature, the reaction temperature will first go below room temperature and then slowly reach room temperature toward the end of the hydrolysis-alkoxylation. Accordingly, for most purposes, it is desired to add the mixture of alcohol and H₂O to the chlorosilanes. Such addition step can take place in any amount of time but it most preferably takes place in a period of time from 0.5 to 2 hours and most preferably from 0.5 to 1½ hours. The mixture should be agitated during the addition of the alcohol and water to the chlorosilanes. After the addition of the alcohol and water to the chlorosilanes in which the hydrolysis-alkoxylation is completed, it is then necessary to reduce the acidity content of the silicone resin alkoxylate that is formed. The reason for this is that if the acidity of the silicone alkoxylate is much above 100 parts per million then the acid content in the silicone alkoxylate will, when the water is added in the subsequent hydrolysis step as will be disclosed below, catalyze the condensation of silanol and alkoxy groups resulting in a formation of a silicone resin of high viscosity as the silicone resin product which is undesired in accordance with the present invention.

The acid/water and methanol and the silicone resin alkoxylate is then heated at a temperature in the range of 60° to 80° C. so as to drive off hydrogen chloride acid that is formed during the hydrolysis. At any rate, it is desired to heat the silicone alkoxylate in the foregoing temperature range to drive off as much hydrogen chloride as is possible. At the end of this step there results a silicone alkoxylate having an alkoxy content of anywhere from 5 to 40% by weight with a hydrogen chloride content of anywhere from 0.5 to 2% by weight.

Accordingly, it is still desirable at this point to reduce the acidity of the siicone alkoxylate. To accomplish this there is added to said silicone alkoxylate of anywhere from 0.1 to 2 parts of an aliphatic alcohol and preferably an aliphatic alcohol of 1 to 3 carbon atoms such as, methanol, per part of the silicone alkoxylate. The alcohol is mixed with the silicone alkoxylate and then is desirably distilled off at temperatures in the range of 80° to 100° C. either under atmospheric pressure or subatmospheric pressure to remove the alcohol and strip off, along with the alcohol, the hydrogen chloride in the silicone alkoxylate. This step may be repeated any number of times until the acidity of the alkoxylate is below 1000 parts per million. The addition of the methanol is repeated as many times as is necessary to bring the acidity of the silicone alkoxylate to the foregoing levels.

Accordingly, at this point it is still desirable to reduce the acidity of the silicone alkoxylate to 100 parts per million or less. In order to accomplish this the necessary amount of alkali metal hydroxide and most preferably, potassium hydroxide or sodium hydroxide is added to the alkoxylate so as to reduce the acidity to 100 parts per million or less.

It should be noted that an alkali metal hydroxide was not used in the initial reduction of acidity since it is highly undesirable to have a large amount of alkali metal salts in the alkoxylate and in the final silicone resin product since such will, in some instances detract from the electrical properties of the silicone resin product. Accordingly, after the alkali metal hydroxide has been added there is obtained a silicone resin alkoxylate with an acid content that does not exceed 100 parts per million and preferably does not exceed 50 parts per million. At this instance then the silicone alkoxylate may then be hydrolyzed. It is this hydrolysis step which is critical in the process of the instant case. The function of the hydrolysis step is to substitute some alkoxy groups with silanol groups in the silicone resin alkoxylate to produce a silicone resin having the viscosities discussed previously. If too much water is added, then too many of the alkoxy groups will be removed, the silicone resin will become too highly crosslinked resulting in a silicone resin with unacceptable high viscosity. If too little water is utilized in the hydrolysis, then sufficient silanol groups will not be imparted to the silicone resin product such that it will be able to cure as desired with most known catalysts. Accordingly, there is desirably added to the silicone alkoxylate of the instant case and having the acidity discussed previously, from generally 0.2 to 0.8 moles of water per mole of alkoxy group in the silicone resin alkoxylate and more preferably from 0.3 to 0.8 moles of water per mole of alkoxy groups in the silicone resin alkoxylate.

It should be noted that for this addition of water in this step which is critical, it is necessary to measure the alkoxy content of the silicone alkoxylate so that the desired amount of water can be added. A silicone resin of the viscosities discussed previously will not be obtained unless the foregoing amounts of water are added as set forth above. The addition is preferably carried out at room temperature to the reflux temperature of the system which is about 75° C. The water may be added with good agitation to the silicone alkoxylate and allowed to react in a period of time of anywhere from 0.5 to 3 hours in a one-step addition. However, most preferably the water is added in two or more increments such as four increments over a period of time varying from 1 to 3 hours with good agitation so as to allow the water to properly mix into the silicone alkoxylate and fully react.

It is desirable in this final hydrolysis reaction that most, if not all, of the water react to replace the alkoxy groups in the desired amount so as to produce the silicone resin product of the instant case having the proper amount of alkoxy groups and having the desired viscosity properties. It is important that almost all of the water that is added react with the silicone resin alkoxylate since that will impart to the silicone resin the desired crosslinked resinous structure. Accordingly, to facilitate such complete reaction and in addition to the incremental addition of water that is recommended above, there may be utilized as a solvent the foregoing aliphatic alcohols of 1 to 3 carbon atoms and most preferably methanol. In order to facilitate the foregoing reaction there may be added anywhere from 0.1 to 2 parts per part of the alkoxylate of the aliphatic alcohol to the silicone alkoxylate. The water and alcohol can be mixed, the alcohol solubilizing the silicone alkoxylate and water so that the hydrolysis reaction with the water takes place more rapidly and more fully. It may be noted that additional alcohol is generated during the hydrolysis reaction. After the necessary period of time, as specified above, of 0.5 to 3 hours and more preferably from 1 to 3 hours there results a silicone resin product of the instant case with some methanol and possibly very small amounts of water being present. Such methanol and water can then be stripped off at temperatures in the range of 80° to 100° C. at atmospheric pressure or subatmospheric pressure to yield the desired silicone resin product of the instant case at 100% solids having a viscosity varying from 200 to 5,000 centipoise at 25° C., and more preferably having a viscosity varying from 500 to 2,000 centipoise at 25° C.

It should be noted that the acid content of the silicone resin alkoxylate of the instant case is quite important in that in the hydrolysis step the acid content of the silicone resin alkoxylate should not exceed 100 parts per million, but more preferably does not exceed 50 parts per million and most preferably does not exceed 15 parts per million. Accordingly, with the above process there is obtained a silicone resin with an R to Si ratio where R was as previously defined in which the R to Si varies from 1.0 to 1.9:1, the resin has a silanol content that varies anywhere from 1 to 5% by weight and an alkoxy content that varies anywhere from 7 to 14% by weight and more preferably varies anywhere from 7 to 12% by weight. This silicone resin is the desired silicone resin of the instant invention. Such a silicone resin may be utilized at 100% solids as such and may be utilized to form a coating which may be cured by the well known catalysts utilized for silicone resins, that is, metal salts of a carboxylic acid. Accordingly, to cure such a silicone resin there may be added to it a curing catalyst at a concentration of 0.05 to 0.5% of metal by weight of the resin of a metal salt of a carboxylic acid where the metal is selected from the class varying from manganese to zinc in the Periodic Table with the exception of iron and heating the mixture at a temperature of about 150° C., and more preferably at 250° C. The best cure takes place upon heating of the resin at a temperature of 200° or 250° C. The metal salts of iron are not preferred as a catalyst with the resins of the instant case since it has been found that although when utilized as catalysts they result in a silicone film of excellent hardness and of excellent cure, such a cured film does not have good heat stability at temperatures of 250° C. or above.

Accordingly, iron salts of carboxylic acids are not preferred as catalysts for the silicone resins of the instant case unless such silicone resin coatings that are formed are to be utilized or exposed at temperatures below 250° C. It has been found, however, that the silicone resins of the instant case can be cured with iron salts of carboxylic acids to form coatings of excellent hardness and of some measure of thermal stability at temperatures of 250° C. or above by utilizing as a catalyst from 0.005% by weight or less of iron as the iron salt of a carboxylic acid based on the weight of the total silicone acid composition, in combination with 0.05 to 0.5% by weight of another metal as the metal salt of carboxylic acid, that is, metals varying from manganese to zinc in the Periodic Table such as, for instance, zinc octoate.

The most preferred catalysts for utilization with the silicone resin of the instant case and in which cure can take place at temperatures above 150° C. and more preferably at temperatures above 200° or 250° C. in which the cured silicone resin coating has good hardness as well as good thermal stability at temperatures of 250° C. or above, are zinc salts and manganese salts of carboxylic acids, such as zinc octoate or manganese octoate. However, even though the above catalysts are suitable with the silicone resins of the instant case in producing silicone resin coatings of good hardness and excellent thermal stability, they have one disadvantage, that is they normally do not start the cure of the silicone resin until the temperature of normally above 200° C. or 250° C. is reached. Accordingly, during such heating step a certain amount of the volatiles in the silicone resin will be volatilized before cure of the silicone resin takes place, thus, resulting in loss of silicone resin product. Accordingly, it is highly desirable to have a catalyst system for such silicone resins which initiates the cure of the silicone resin at temperatures lower than 250° or 200° C.

Accordingly, there is also a third type of a catalyst system disclosed for the silicone resins of the instant case which is composed of from 0.5 to 4.0% by weight of the total composition of the catalyst which is the combination of 25 to 75% by weight of a metal salt of a carboxylic acid, the metal being selected from the class consisting of metals varying from manganese to zinc in the Periodic Table with the exception of iron and from 25% to 75% by weight of an amine functional silane. Generally, when both types of catalyst systems are considered, the catalyst can be used at a concentration of anywhere from 0.5 to 4% by weight of metal and aminoxy silane based on the silicone resin. The mixture is then heated at temperatures above 100° C., and more desirably in the range of 140° to 180° C. to effect the cure of the silicone resin to form a silicone coating of good hardness and good thermal stability at temperatures of 250° C. or above.

As noted previously in this additional catalyst system, it is not desired that iron salts of carboxylic acids be utilized in the catalyst system for the reasons given before. With respect to the amine functional silanes, such amine functional silanes can be any type of amine functional silanes but are more preferably selected from amine alkylene silanes in which the alkylene group is anywhere from 2 to 8 carbon atoms long. The most preferred amine functional silanes are the gamma-aminopropyltriethoxysilanes and mixtures of such propyl amino silanes which are well known in the art. The foregoing metal salt of a carboxylic acid may be mixed with the amine functional silane in the desired proportions.

The most preferred range for amine functional silanes to metal salt of carboxylic acid being in the 22-75 by weight concentration so that the catalyst system is composed of 25% by weight of the amine functional silane and 75% by weight of the metal salt of a carboxylic acid. Utilizing such a catalyst system the cure is initiated at temperatures of as low as 125° C. and is completed at temperatures of 180° C. or in the range of 160° to 200° C., thus minimizing the escape of volatiles from the silicone resin product of the instant invention prior to cure. Accordingly, in such a catalyst system not only is good hardness and good thermal stability obtained from the silicone coating that is formed but cure is initiated at temperatures as low as 125° C., thus minimizing the loss of volatiles from the silicone resin product. The only disadvantage with such a curing catalyst system is that it has a short shelf life. The system must be used within 24 hours after the aminoxy functional silane has been added to the mixture. Such a curing catalyst sytem offers the advantages of low loss of volatiles, that is, the advantage of the SiH olefin platinum catalyzed silicone resin systems of the prior art that was discussed previously without incurring as much an expense in production of the system as is the case with the system of the prior art that was discussed previously.

The silicone resins of the instant case have many uses, but the two most prominent uses for such silicone resins are that they can be utilized in the formation of silicone paints and silicone varnishes and similar types of coating systems. In the production of silicone paints the silicone resin of the above case is used at 100% solids with a pigment where there is present from 0.05 to 0.5% of the total composition of one of the curing catalysts discussed previously and other normal ingredients utilized in such silicone resin paint systems. The resulting silicone paint may then be applied to the substrate and cured at elevated temperatures to form a hard silicone paint coating which has thermal stability as high as 250° C. or above. The silicone resins of the instant case can also be utilized to produce silicone varnishes which is accomplished by taking the resin at 100% soids where there is present from 0.05 to 0.5% by weight of the resin, the curing catalysts disclosed previously, and curing by simply heating the coated surface at temperatures of 200°-250° C., resulting in a cured silicone varnish coating in a period of time varying anywhere from 30 to 60 minutes. But especially the silicone resin of the instant case may be utilized at 100% solids in forming various silicone coatings on various substrates with or without the use of primers and with the above curing catalyst systems to form silicone coatings for the usual electical insulative applications.

The silicone resin of the instant case may also be approximately duplicated by mixing or preparing a mixture of a high silanol silicone resin disclosed by the prior art and a high alkoxy containing resin as taught by the prior art. Accordingly, in another less preferred embodiment of the instant case, there is provided a solventless silicone resin system having a viscosity at 100% solids varying from 200 to 5,000 centipoise at 25° C., comprising (a) from 50 to 15% by weight of a first silicone resin when said resin is composed of organo trifunctional siloxy units and diorgano trifunctional siloxy units where the organo to Si ratio varies from 1.0 to 1.9:1 and a hydrocarbonoxy content that varies from 10 to 25% by weight and a silanol content that is less than 1% and (b) from 50 to 85% by weight of a second silicone resin composed of monoorgano trifunctional siloxy units and diorganodifunctional siloxy units where the organo to Si ratio varies from 1.0 to 1.9:1 having a hydrocarbonoxy content that varies from 0 to 4% by weight and a silanol content that varies from 3 to 8% by weight where the organo groups in said resin are selected from the class consisting of alkyl radicals, cycloalkyl radicals, alkenyl radicals, aryl radicals and fluoroalkyl radicals, all having up to 8 carbon atoms and mixtures thereof. In short, the organo substituent groups in such prior art silicone resins which forms the mixture can be selected from any of the monovalent hydrocarbon radicals and halogenated monovalent hydrocarbon radicals defined previously, and for the organo substituent groups of the preferred silicone resin of the instant case.

The silicone resin is produced by dissolving the second silicone resin in a hydrocarbon solvent, the second silicone resin being a solid at room temperature, to form a solution if the resin is not in solution already, mixing in the first said silicone resin in said solution and after mixing, stripping off the hydrocarbon solvent at elevated temperatures to leave behind a solventless resin system. Any well known hydrocarbon solvent can be utilized. Examples of such solvents that may be utilized are, for instance, xylene, toluene, benzene, cyclohexane, cycloheptane, chlorinated hydrocarbon solvents and etc.

The first silicone resin that was discusssed previously is a highly methoxylated silicone resin which is a solventless silicone resin, that is, it is a liquid at room temperature and has a viscosity of anywhere from 50 to 200 centipoise at 25° C. The only reason why the first silicone resin cannot be utilized by itself is that it does not have sufficient silanol groups in the resin to cure properly to form a hard silicone resin coating. As such, such silicone resins have limited uses except as intermediates.

The second silicone resin while having sufficient silanol groups to allow curing to a hard coating, nevertheless, has such a high viscosity at room temperature at 100% solids that it has to be dissolved in a solvent to be utilized.

Accordingly, such second silicone resin, that is the silanol resin, is dissolved in a hydrocarbon solvent at anywhere from 5 to 50% solids then the first silicone resin, that is the high alkoxy resin may be added to a solids concentration of anywhere from 5 to 40% by weight in the solvent. The resulting resins are dissolved and then the hydrocarbon is stripped off under reduced pressure to leave behind a solventless silicone resin system which has properties approximating the properties of the first silicone resin of the instant case. A high silanol content resin may be obtained by a process well known in the prior art and comprises usually a process of agitating a mixture of organohalosilanes where the organohalosilanes were as previously defined. The organo substituent group on such organohalosilanes is the same as those organo substituent groups as was previously defined for the radical R. There is mixed with such organohalosilanes from about 1.7 parts to about 10 parts by weight of water, per part of organohalosilane; from about 0.2 to about 0.5 parts of acetone per part of organohalosilane; and from about 0.3 to about 5 parts by weight of a water immiscible organic solvent per part of organohalosilane where the organo water immiscible organic solvent may be any water immiscible organic solvent such as, xylene, toluene and etc., and from 0 to about 1 mole of an aliphatic alcohol having from 1 to 8 carbon atoms per mole of halogen attached to the silicon of the organohalosilane. Then there is separated the organic solvent solution of a silanol containing polydiorganosiloxane having an average ratio from 1 to 1.9 organo radicals per silicon atom from said hydrolysis mixture. The resulting silicone resin hydrolyzate that is obtained from such hydrolysis procedure is simply washed with water until the acidity is reduced to the desired level that is below 100 parts per million and more preferably below 50 parts and most preferably below 15 parts per million. Such reduction of acidity is carried out by decantation of the acid/water mixture and also by stripping off the hydrogen chloride gas initially formed in well known stripping procedures results in the high silanol content silicone resin.

It should be noted that the halo in such organohalosilane reactant is most preferably chlorine. The organohalosilane mixture may be any organohalosilane mixture and is preferably selected from an organotrichlorosilane, or a mixture of organotrichlorosilane and diorganodichlorosilane, or a reaction product of an aliphatic monohydric alcohol having from 1 to 8 carbon atoms and a mixture of organotrichlorosilanes and diorganodichlorosilanes, and the mixture of such a reaction product and with the mixture of organotrichlorosilane and diorganodichlorosilane wherein the foregoing organo groups are the same as given previously for the R radical defined for the chlorosilanes utilized to produce the preferred silicone resin product of the instant case.

Utilizing such a procedure there is obtained a high silanol content resin in which the organo to Si ratio may vary anywhere from 1.0 to 1.9:1 and most preferably varies from 1.1 to 1.9:1 and having an alkoxy content that varies anywhere from 0 to 4% by weight and a silanol content that varies anywhere from 3 to 8% by weight. The production of such prior art silicone resins is most fully disclosed in the patent application of Duane F. Merrill, Ser. No. 628,001, filed on Nov. 3, 1975, still pending in the Patent Office. Modifications of the foregoing procedure can also be found in the patents of Duane F. Merrill, U.S. Pat. Nos. 3,450,672 and 3,790,527, incorporated into the present case by reference.

Variations of the above procedures are also known in the art for producing the high silanol content resin and any such procedure can be utilized to produce such a resin. It should be noted that such resins produced by the utilization of the procedures set forth in the foregoing patent application and patents of Duane F. Merrill, results in a silicone resin which is a solid at room temperature.

The high alkoxy resin can also be produced by methods well known in the prior art following the first hydrolysis-alkoxylation step in the foregoing patent of Roedel, U.S. Pat. No. 3,846,358. This resin is simply produced as recited in the patent by contacting a mixture of organotrihalosilanes and diorganodihalosilanes (where the halogen is chlorine and where the organo groups are the same as the R radicals defined above for the procedure for producing the preferred silicone resin of the instant case), with from about 0.05 to 1 part of water per part of organochlorosilane and with from 0.1 to 1 part of an aliphatic alcohol having from 1 to 8 carbon atoms forming an alkoxylated organosiloxane hydrolyzate having from 5 to 40% by weight of the alkoxy groups.

The rest of the steps of the Roedel patented process are not followed except for decreasing the acid content. Accordingly, the silicone resin alkoxylate obtained from this first step of the foregoing Roedel U.S. Pat. No. 3,846,358 is isolated by removing or by stripping the methanol off at elevated temperatures. The acid content is decreased by washing the hydrolyzate with an aliphatic alcohol, preferably methanol, and then removing aliphatic alcohol by stripping until the acid content does not exceed 1000 parts per million. Then finally the acid content is further reduced such that it does not exceed 50 parts per million and more preferably does not exceed 15 parts per million by adding an alkali metal hydroxide to the silicone resin so as to decrease the acid content to the desired level. As stated previously, any excess methanol that has been added during the washing steps is removed by stripping at elevated temperatures of 150°–160° C. either at atmospheric pressure or at sub-atmospheric pressure. As a result of this procedure there results a silicone resin having hydrocarbonoxy content or alkoxy content varying anywhere from 5 to 40% by weight and more preferably for use in the instant process from 10 to 40% by weight, and a silanol content that is up to 0.5% by weight.

It should be noted that although traces of silanol may be present such silicone resins still do not have a sufficiently high silanol content to cure properly with most of the known metal salts of carboxylic acid catalyst.

The process for producing the high alkoxylated silicone resin of the prior art is basically the first step in the process of the foregoing Roedel, U.S. Pat. No. 3,846,358, followed by acid reduction and isolation of the silicone resin. It should be noted that if a subsequent hydrolysis step of the Roedel patents is carried out that there is obtained a solid as the silicone resin product. Such a material is unsuitable for forming the silicone resin blends of the instant case. However, utilizing this procedure there is obtained a highly alkoxylated silicone resin having a methoxy content varying anywhere from 5–10 and more preferably 10–40% by weight and a viscosity of anywhere from 25 to 200 centipoise at 25° C. It should be noted that while such a silicone resin has some uses, nevertheless, it is highly undesirable for directly forming coatings such as electrical protective coatings or silicone paint coatings since it will not cure properly even with the application of a metal salt of a carboxylic acid and even with the use of heat to cure the resin.

To obtain the solventless silicone resin blend of the less preferred embodiment of the instant case, the high silanol content resin is simply taken as a solution in a hydrocarbon solvent such as xylene, toluene, benzene, cyclohexane, cycloheptane or the chlorinated hydrocarbon solvents at a solids concentration of anywhere from 5 to 50% by weight and the high alkoxy content resin is then added to the solution and dissolved at a concentration of anywhere from 5 to 45% by weight. When the solution is complete, then the solvent is simply stripped off to give the less preferred solventless silicone resin of the present case.

The Examples below are given to illustrate the reduction to practice of the invention. They are not given to set limits as to the scope of the instant invention. All parts are by weight.

EXAMPLE I

There was composed a Resin A comprising adding 2400 parts of phenyltrichlorosilane to 830 parts of hexyltrichlorosilane and there is added to the blend, a blend of 549 parts of methanol and 258 parts of water over a period of time of 50 minutes. The pot temperature was 25° C. at the beginning, but dropped to 3° C. and at the end of the addition was 18° C. The mixture was then heated to reflux at 78° C., cooled and then added to it 130 parts of MeOH, stirred for 5 minutes and stripped to 100° C. at 100 mm of mercury vacuum. The acidity was 1010 parts per million HCl. Then there was added to it sufficient amounts of a 30% by weight of KOH in methanol solution to reduce the acidity to 9 parts per million HCl. The methoxy content was 18.9% by weight. Then took 270 parts of the above methoxylate and added 75.5 parts of MeOH and 5.95 parts of $H_2O$ to give a water to methoxy mole ratio of 0.2, heated the mixture to reflux for 1 hour at 68° C. and then stripped the mixture to 100° C. at 100 mm mercury vacuum to yield Resin A.

There was taken 250 parts of methoxylate intermediate above used to form Resin A and adjusted to 12 ppm of HCl. To this there was added 70 parts of MeOH and 8.2 parts of water. The resulting mixture was heated to reflux and refluxed for 1 hour at a pot temperature of 68° C. The resulting silicone resin and methanol mixture was then heated to 100° C. at 100 mm. of vacuum to strip off the methanol. The silicone resin liquid was filtered to give the silicone resin product, which is Resin B.

There was prepared a Resin C where in the methoxylate which was utilized in the preparation of Resin A containing 18.9% by weight of methoxy groups was taken, that is, 250 parts of such methoxylate was taken and adjusted to 12 parts per million of acidity. There was added to this 70 parts of methanol with 10.9 parts of water. The resulting mixture was heated to reflux and refluxed for 1 hour at 70° C. The methanol was then stripped off at 100° C. and 100 mm. of mercury vacuum and the silicone resin liquid that was left was filtered to obtain the Resin C product.

There was then prepared a Resin D in accordance with the prior art procedures. Resin D was prepared by taking 74.3 parts of phenyltrichlorosilane and 25.7 parts of hexyltrichlorosilane and adding to this blend 30.3 parts of methanol and 4.1 parts of water. During addition, the temperature dropped and then rose back to room temperature. The resulting mixture was then heated to reflux for 15 minutes at a temperature of 70°–90° C., and cooled to room temperature. Then 4 parts of methanol was added to it and methanol and hydrogen chloride were stripped off by heating the mixture at atmospheric pressure to a temperature of 125°–130° C. At the end of this stripping procedure, there was 1000 to 3000 parts per million of HCl in the silicone resin methoxylate. There was then added to the methoxylate 5.7 parts of methanol and a 45% aqueous potassium hydroxide solution to reduce the acidity of the silicone alkoxylate to 80 to 150 parts per million of hydrogen chloride. The methoxylate was then heated to reflux at a temperature of 70°–75° C., and there was added 11 parts of water in 4 equal increments of 2.75 parts each allowing 15 minutes reflux between additions. Then the entire mixture was refluxed for an additional 1 hour. At the end of that time, the mixture was stripped to remove methanol and excess water at 95° C. at atmospheric pressure and then the pressure during such stripping procedure was reduced to 100 mm of mercury. At the end of that time there was obtained a highly viscous silicone resin which was dissolved in first 5.3 parts of n-butyl acetate and then reduced further in viscosity by addition of mineral spirits. The final properties as well as the hydrolysis conditions of these silicone resins is given in Table I below, for comparison purposes. It should be noted that the viscosities of the resins produced in accordance with the instant process were much lower than the viscosity of the prior art resin—Resin D.

TABLE I

| Material | Hydrolysis Conditions | | Product Properties | | |
|---|---|---|---|---|---|
| | ppm HCl | $H_2O$/OMe | Visc. (cps) | % OH | % OMe |
| Resin D | 100 | 1.0 | Thick semi-solid | 3.5–4.0 | 1.0–2.0 |
| Resin A | 9 | 0.2 | 485 | 1.9 | 14.1 |
| Resin B | 12 | 0.3 | 977 | 1.5 | 13.4 |
| Resin C | 12 | 0.4 | 2270 | 3.1 | 12.2 |

EXAMPLE II

There was prepared a Resin E in accordance with the process of the instant case, comprising taking 318 parts of methyltrichlorosilane, 795 parts of phenyltrichlorosilane, 774 of dimethyldichlorosilane, 1113 parts of diphenyldichlorosilane and adding to this blend a blend of 474 parts of methanol and 216 parts of water, which addition took place over an hour. The mixture during such addition dropped from the initial temperature of 25° C. to −2° C. and then rose to 24° C. by the end of the addition. The resulting mixture was heated to reflux and refluxed for 15 minutes at 68° C. Then there was added to it 120 parts of methanol and the mixture was stripped at 100° C. and 100 mm. of vacuum. This addition of methanol and stripping was repeated after which the acidity was reduced to 540 parts of HCl. Then the acidity of the mixture was adjusted to 4 parts per million of HCl by adding $NaOCH_3$ in methanol. This methoxylate contained 15% by weight of methoxy groups. Then 250 parts of the methoxylate was taken and there was added to it 60 parts of methanol and 12.2 parts of water. The mixture was refluxed for 1 hour at 71° C. and methanol was stripped off at 100° C. and 100 mm. of vacuum to yield the Resin E as a product.

Resin F was then prepared. There was then taken 250 parts of the methoxylate utilized or prepared in accordance with the procedure for preparing Resin E as set forth above and there was added to it 60 parts of methanol and 14.7 parts of water. The resulting mixture was heated to reflux for 1 hour at 75° C., and at the end of that time the methanol was stripped off at 100° C. and 100 mm. of mercury vacuum to yield the silicone resin product—Resin F.

There was prepared a Resin G by taking 250 parts of the methoxylate produced in accordance with the procedure set forth in the production of Resin E and there was added to such methoxylate 60 parts of methanol and 17.2 parts of water. The resulting mixture was heated to reflux for 1 hour at a temperature of 72° C. At the end of that time, the methanol was stripped off at 100° C. temperature and 100 mm. of vacuum.

There was prepared a Resin H. Such procedure comprised taking 236 parts of methyltrichlorosilane, 665 parts of phenyltrichlorosilane, 203 parts of dimethyldichlorosilane, 398 parts of diphenyldichlorosilane and adding to such chlorosilanes a blend of 231 parts of methanol and 119 parts of water over a 42 minute period. During such addition the pot temperature dropped from 25° C. to −2° C. and then rose to 23° C. The resulting mixture was heated to reflux for 15 minutes at a temperature of 67° C. Then there was added to it 60 parts of methanol and the methanol and HCl was stripped off at a temperature of 100° C. and 100 mm. of mercury vacuum. Another 60 parts of methanol was added and upon stripping to 100° C. at 100 mm. the acidity was reduced to 419 parts per million of HCl. Addition of a third portion of methanol and stripping reduced the acidity to 83 parts per million of HCl. There was then added to the methoxylate 10 parts of calcium carbonate and 60 parts of methanol and the mixture was refluxed for 15 minutes. There was further added to it 5 parts of Celite 545 and the resulting mixture was stripped at 100° C. and 100 mm. of mercury vacuum. The resulting mixture was then filtered to remove excess calcium carbonate and filter aid and there resulted a silicone methoxylate having 5 parts per million of HCl. At the end of this step, 160 parts of the methoxylate was taken which methoxylate contained 17.5% of methoxy groups and there was added to it 36.6 parts of methanol and 6.6 parts of water. The resulting mixture was heated to reflux and refluxed for 1 hour at 70° C. The methanol was then stripped off at 100° C. and 100 mm. of mercury vacuum to leave behind the desired product Resin H. The hydrolysis conditions and the product properties of the silicone resins produced in accordance with the procedures above of Resins E, F, G, H are set forth in Table II below. The data in Table II below indicates that there is obtained the preferred silicone resin of the instant case with the properties discussed previously by following the process conditions of the instant case.

TABLE II

| Material | Hydrolysis Conditions | | Product Properties | | |
|---|---|---|---|---|---|
| | ppm HCl | H$_2$O/OMe | Visc. (cps) | % OH | % OMe |
| Resin E | 4 | 0.53 | 370 | 2.0 | 8.0 |
| Resin F | 4 | 0.64 | 500 | 2.7 | (8.3) |
| Resin G | 4 | 0.75 | 930 | 2.1 | 7.1 |
| Resin H | 5 | 0.40 | 3160 | 1.5 | 10.6 |

EXAMPLE III

Then samples of Resin F was taken as prepared and disclosed in Example II and were cured in 1 mil. films with different metal salts of carboxylic acid as indicated below. The resulting films were tested for hardness by passing pencils of different hardness over the cured film surface and noting if the pencil scratched the surface. Further heat tests were carried out for the resin cured with metal salt of carboxylic acid as indicated below for different times of cure. In addition, the hardness of the pencil that did not scratch the surface of the cured coating that is the highest hardness of the pencil that did not scratch the cured coating of the silicone resin is indicated in Table III below.

Accordingly, the foregoing tests of Resin F for its cured coating hardness for different curing time at a temperature of 250° C. is indicated in Table III below.

TABLE III

| Cure of Solventless Resin in 1-mil Films | | | | |
|---|---|---|---|---|
| Material | Metal Octoate Catalyst | Pencil Hardness Minutes at 250° C. | | |
| Resin F | As Metal | 15 | 30 | 60 |
| A | 0.005% Fe | HB | F | F |
| B | 0.500 Zn | 5B | 2B | B |
| C | 0.100 Mn | <6B | 4B | 3B |
| D | 0.100 Co | <6B | 5B | 3B |

In Table III above the A, B, C, and D under Material indicate different samples of Resin F that were tested with the different metal salts of carboxylic acids as indicated in the Table. In addition to the above tests, Samples of Resin F were tested again being cured by different metal salts of carboxylic acids as indicated in Table IV below wherein the samples were cured at a temperature of 250° C. for periods of time varying from 30–60 minutes to 24 hours and the hardness of the surface again was determined by the pencil test. In addition, such cured samples were then maintained at 250° C. after the hardness test to determine how long they could be kept at that temperature before cracking.

Accordingly, the data on Table IV below indicates also this information giving as such the thermal stability of the silicone resin coating formed from Resin F as cured by different curing catalysts. The data that was obtained from such tests is as follows:

TABLE IV

| Thermal Stability of 1-mil Film of Solventless Resin | | | | | |
|---|---|---|---|---|---|
| Material Resin F | Metal Octoate Catalyst as Metal | Pencil Hardness Time at 250° C. | | | Hours Crack free time at 250° C. |
| | | 30 min. | 60 min. | 24hrs. | |
| A | 0.005% Fe | F | F | H | 24 |
| B | 0.500 Zn | 2B | B | 2H | >240(3H) |
| C | 0.100 Mn | 4B | 3B | H | >240(2H) |
| D | 0.100 Co | 5B | 3B | HB | >240(3H) |

EXAMPLE IV

This Example illustrates the formation of the less preferred alternate embodiment of the instant case wherein the solventless silicone resins are formed by mixing high silanol content resins with high alkoxy content resins.

Accordingly, there was prepared a Resin K comprising taking 159 parts of methyltrichlorosilane, 398 parts of phenyltrichlorosilane, 387 parts of dimethyldichlorosilane and 557 parts of diphenyldichlorosilane which was added to 1350 parts of toluene and 1350 parts of acetone, and 4500 parts of water. The addition took place over 75 minutes and the resin-solvent phase was separated after the hydrolyzate mixture had been allowed to settle for 30 minutes. To the resin phase there was added 45 parts of water and the mixture stripped at atmospheric pressure to at 150° C. to yield a silicone resin solution in toluene having a solids content of 80.7% by weight and an acidity of 26 parts per million of HCl. To the resin solution was added 150 parts toluene and 30 parts of water and the solution again stripped at atmospheric pressure to 150° C. to yield a resin solution in toluene of 83.1% solids and an acidity of 17 parts per million HCl. Utilizing such a procedure there was obtained Resin K.

Then there was obtained a Resin J which was obtained by utilizing the same concentration of ingredients and same procedure as set forth for Resin K except the resin was obtained at 84.2% solids in toluene and having acidity of 25 parts per million of HCl. Resin J represents another batch of Resin K.

Then there was obtained a Resin L, which was produced by taking 831 parts of phenyltrichlorosilane, 530 parts of dimethyldichlorosilane, 111 parts of diphenyl dichlorosilane, and 29 parts of trimethylchlorosilane and hydrolyzing the blend in a mixture of 1350 parts of toluene, 1350 parts of acetone and 4500 parts of water. The entire addition took place over 35 minutes during which the reaction temperature was kept below 45° C. The phases were allowed to separate. There was added to the silicone hydrolyzate 45 parts of water and water and solvent were stripped off to 100° C. at atmospheric pressure. There results a silanol containing resin dissolved in toluene containing 38.6% solids and 11 parts per million of acid. The silanol content of the silicone resin was 7.5% by weight.

The foregoing resins K, J and L were then blended with a Resin N and stripped of solvent to obtain the solventless silicone resin system of the instant case, as was discussed previously. Resin N was obtained by taking a blend of 62.2 parts of phenyltrichlorosilane 24.2 parts of dimethyldichlorosilane and 13.6 parts of diphenyldichlorosilane and adding to it a blend of 17.1 parts of methanol and 7.5 parts of water. The addition was over a 1-2 hour period and methanol and water was added to the silanes. The resulting mixture was then heated to reflux for 15 minutes. To this was added 13.1 parts of wash methanol, the mixture agitated for 10 minutes to 15 minutes and then allowed to settle for 20-30 minutes. The methanol-HCl layer was then decanted off and there was added to the silicone alkoxylate layer 0.5 parts of calcium carbonate and 0.8 parts of Celite 545. The resulting mixture was stirred for 10 minutes and then stripped to 160° C. at 100 mm. mercury pressure. The silicone methoxylate resin remaining was then filtered to yield a silicone resin having a viscosity of 30-70 centipoise at 25° C. and a methoxy content of 18.5 percent by weight.

The foregoing high methoxy silicone resin, Resin N was then mixed in various amounts with the high silanol content resins K, J and L, whose preparation was disclosed previously, and solvent removed by stripping to produce a low viscosity solventless silicone resin system having a viscosity in the range of 200 to 5,000 centipoise at 25° C. which could be cured to produce silicone resin coatings. These solventless silicone resins were prepared by simply adding the high methoxy resin to the solvent solution of the high silanol content resins and stripping off the solvent. Properties of such individual silicone resins as that discussed above, as well as the properties of the final solventless silicone resin blend are set forth in Table V below.

TABLE V

Blends of Hydrolyzate Resins - Methoxy Reactive Resins

| Resin Blend | Hydrolyzate Resin (H) Resin | Hydrolyzate Resin (H) % OH | Methoxy Resin (M) Resin | Methoxy Resin (M) % OMe | Mole Ratio OH/OMe | Wt. Ratio H/M | Visc. Cps. (Gardner) |
|---|---|---|---|---|---|---|---|
| S | K | 6.9 | N | 18.5 | 0.98 | 60/40 | V½ (977) |
| T | K | " | N | " | 1.66 | 71/29 | Y½ (2015) |
| U | K | " | N | " | 2.73 | 80/20 | Z 3 (4630) |
| V | J | 5.8 | N | " | 1.34 | 70/30 | z¼ (2378) |
| W | L | 7.5 | N | " | 2.22 | 75/25 | Z (2270) |
| X | L | " | N | " | 1.50 | 67/33 | W (1070) |

The above data indicate that a solventless silicone resin system can be obtained by the blending in the appropriate amounts the proper types of prior art silicone resins to produce a solventless silicone resin system having the desired viscosity and which produces coatings with desirable properties.

I claim:

1. A process for producing a solventless silicone resin having a viscosity at 100% solids varying from 200 to 5,000 centipoise at 25° C. comprising (a) adding to organo chlorosilanes of the formula,

$$R_a \, Si \, Cl_{4-a}$$

where R is selected from the class consisting of alkyl radicals, cycloalkyl radicals, alkenyl radicals, aryl radicals and fluoroalkyl radicals all having up to 8 carbon atoms and mixtures thereof where a is 1 or 2, from 0.05 to 0.2 part of water and from 0.1 to 1 part of an aliphatic alcohol of up to 3 carbon atoms per part of organochlorosilane to form a silicone alkoxylate; (b) heating the alkoxylate to reflux (c) inserting additional amounts of said aliphatic alcohol to said alkoxylate and removing said alcohol until the acid-content of said alkoxylate is below 1000 parts per million; (d) adding an alkali metal hydroxide to said alkoxylate until its acid content does not exceed 100 parts per million (e) adding water to said alkoxylate such that the amount of water that is added is from 0.2 to 0.8 moles of water per mole of hydrocarbonoxy radicals in said alkoxylate; and (f) heating said alkoxylate so as to effect the hydrolysis reaction with the additional water to obtain the desired resin product.

2. The process of claim 1 wherein after step (a), the alkoxylate is heated to a temperature in the range of 60° to 80° C. to drive off HCl prior to step (c).

3. The process of claim 1 wherein in step (c) there is added from 0.1 to 2 parts of the aliphatic alcohol per part of said alkoxylate and wherein said alkoxylate and alcohol mixture is heated to a range of 80° C. to 100° C. to strip off the alcohol and HCl wherein the step is repeated until the acid content is below 1000 parts per million.

4. The process of claim 3 wherein the aliphatic alcohol has the formula,

R' OH where R' is selected from the class consisting of alkyl radicals of 1 to 3 carbon atoms.

5. The process of claim 4 wherein the aliphatic alcohol is methanol and the alkali metal hydroxide is potassium hydroxide.

6. The process of claim 5 wherein after the potassium hydroxide is added, the acid content of the methoxylate does not exceed 100 parts per million.

7. The process of claim 1 wherein in the step (e) the water is added in increments over a period of time varying from 0.5 to 3 hours.

8. The process of claim 5 wherein the potassium hydroxide is added as a solution in said methanol.

9. The process of claim 7 wherein methanol is added along with the water in step (e) so as to solubilize the water into the alkoxylate and wherein in step (f) said methanol is stripped off to leave behind the silicone resin at 100% solids.

10. The silicone resin product by the process of claim 1 wherein said resin has an R to Si ratio that varies from 1.0 to 1.9 to 1, a silanol content that varies from 0 to 4% by weight and a hydrocarbonoxy content that varies from 7 to 14% by weight.

11. The silicone resin produced by the process of claim 1 wherein the said resin has a R to Si ratio that varies from 1.0 to 1.9 to 1, and a viscosity at 100% which varies from 500 to 2,000 centipoise at 25° C.

12. The process of claim 1 wherein said resin is cured by adding to it from 0.05 to 0.5% of metal by weight of the total composition of a catalyst which is a metal salt of a carboxylic acid selected from the class consisting of metals ranging from manganese to zinc in the Periodic Table with the exception of iron and heating the mixture at a temperature above 200° C.

13. The process of claim 12 wherein said resin is cured by adding to it in addition to the metal salt catalysts the iron salt of a carboxylic acid at a concentration of from 0.005% iron or less by weight of the total composition.

14. The process of claim 1 wherein said resin is cured by adding to it from 0.5 to 4.0% by weight of the total composition of a catalyst which is the combination of 25 to 75% by weight of the metal salt of a carboxylic acid the metal ion being selected from the class consisting of metals ranging from manganese to zinc in the Periodic Table with the exception of iron and 25 to 75% by weight of an amine functional silane, and heating the mixture at a temperature above 100° C.

15. The process of claim 14 wherein the amine functional silane is gamma aminopropyltriethoxy silane.

* * * * *